(12) United States Patent
Nakanishi et al.

(10) Patent No.: US 6,674,395 B2
(45) Date of Patent: Jan. 6, 2004

(54) RADAR SYSTEM AND METHOD OF ADJUSTING CHARACTERISTICS THEREOF

(75) Inventors: Motoi Nakanishi, Nagaokakyo (JP); Toru Ishii, Hirakata (JP); Tetsu Nishimura, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/345,962

(22) Filed: Jan. 17, 2003

(65) Prior Publication Data

US 2003/0151543 A1 Aug. 14, 2003

(30) Foreign Application Priority Data

Feb. 8, 2002 (JP) ........................................ 2002-032656

(51) Int. Cl.[7] .......................... G01S 13/34; G01S 13/42; G01S 13/93
(52) U.S. Cl. .......................... 342/109; 342/70; 342/128
(58) Field of Search .......................... 342/70, 84, 109, 342/111, 128, 129, 135, 174, 192, 104, 189, 200, 201, 112, 196

(56) References Cited

U.S. PATENT DOCUMENTS

| | | | |
|---|---|---|---|
| 5,905,458 | * | 5/1999 | Ashihara ..................... 342/70 |
| 5,963,162 | * | 10/1999 | Mochizuki et al. ......... 342/109 |
| 6,445,335 | * | 9/2002 | Tamatsu ..................... 342/70 |
| 6,563,454 | * | 5/2003 | Akasu ........................ 342/109 |
| 2002/0180633 | * | 12/2002 | Nakanishi et al. .......... 342/109 |

FOREIGN PATENT DOCUMENTS

| | | |
|---|---|---|
| JP | 07-198833 | 8/1995 |
| JP | 10-197625 | 7/1998 |

* cited by examiner

Primary Examiner—Ian J. Lobo
(74) Attorney, Agent, or Firm—Keating & Bennett, LLP

(57) ABSTRACT

A radar system includes a transmitting/receiving unit, having a voltage controlled oscillator, for repeatedly transmitting a triangular transmission signal including a frequency-gradually-rising up-modulation interval and a frequency-gradually-dropping down-modulation interval and for receiving a reception signal including a reflected signal from a target, a frequency analysis unit, a data storing unit for storing time-varying characteristics of input values to a D/A converter that monotonically change an oscillation frequency of the voltage controlled oscillator with time, in the form of data concerning an expression representing the time-varying characteristics, and a data processing unit for determining the input values to the D/A converter with reference to the data. At least one of the relative distance to the target and the relative speed of the target is detected based on a beat signal during the up-modulation interval and the beat signal during the down-modulation interval.

23 Claims, 6 Drawing Sheets

RADAR SYSTEM AND METHOD OF ADJUSTING CHARACTERISTICS THEREOF

BACKGROUND OF THE INVENTION

1. Field of the Invention

The present invention relates to a radar system for detecting a target with radio waves.

2. Description of the Related Art

FM-CW (frequency-modulated continuous-wave) radar systems have been developed as in-vehicle radar systems, which are mounted on mobile bodies such as vehicles, for detecting, for example, other vehicles, human beings, and obstructions.

An FM-CW radar system transmits a frequency-modulated continuous-wave signal as a transmission signal, mixes a reception signal (transmission signal reflected from a target) and the transmission signal to generate a beat signal, and detects the relative position and the relative speed of the target based on the frequency of the beat signal.

Circuits for generating the transmission signal include a voltage controlled oscillator (hereinafter referred to as a VCO) in which an oscillation frequency varies in accordance with a control voltage. Since the relationship between the control voltage and the oscillation frequency in the VCO is known, it is possible to perform the desired frequency modulation by controlling the control voltage applied to the VCO.

However, the characteristic of the oscillation frequency with respect to the control voltage applied to the VCO is not necessarily the same for every VCO. Also, the characteristic varies with temperature.

In order to solve the above problems, prior art reference (1), Japanese Unexamined Patent Application Publication No.7198833, discloses a radar system that performs nonlinear correction of a VCO by pre-storing data relating to the control voltage applied to the VCO in a memory and reading the stored data, and prior art reference (2), Japanese Unexamined Patent Application Publication No.10-197625, discloses a radar system that stores in a memory data relating to a correction voltage used for correcting the control voltage applied to a VCO in accordance with the temperature and corrects the control voltage in accordance with the temperature of the VCO.

However, in the radar system disclosed in prior art reference (1), a large memory is required for storing the corrected control voltage data. In the radar system disclosed in prior art reference (2), since the temperature data is also stored, a much larger memory is required. Thus, the circuit size disadvantageously increases, resulting in very high cost for these known radar systems.

SUMMARY OF THE INVENTION

In order to overcome the problems described above, preferred embodiments of the present invention provide a compact radar system having reduced memory space at a much lower cost.

In addition, preferred embodiments of the present invention provide a method of adjusting characteristics of a radar system in which the linearity in the rising phase (period) and the falling phase (period) of a transmission frequency varying with time can be corrected for the entire radar system without being affected by variations in individual components.

According to a preferred embodiment of the present invention, a radar system includes a transmitting/receiving unit for repeatedly transmitting a triangular transmission signal including an up-modulation interval when a frequency increases gradually and a down-modulation interval when a frequency decreases gradually, and for receiving a reception signal including a reflected signal from a target. The transmitting/receiving unit has a voltage controlled oscillator for determining a transmission frequency, and a voltage signal for frequency modulation being supplied to the oscillator. The radar system also includes a frequency analysis unit for calculating data concerning the frequency spectrum of a beat signal that has a frequency that is substantially equal to the difference between the frequency of the transmission signal and that of the reception signal, a data storing unit for storing time-varying characteristics of input values to a D/A converter that monotonically change an oscillation frequency of the voltage controlled oscillator with time, in the form of data concerning an expression (formula) representing the time-varying characteristics, and a data processing unit for determining the input values to the D/A converter with reference to the data. The radar system detects at least one of the relative distance to the target and the relative speed thereof based on the beat signal during the up-modulation interval and the beat signal during the down-modulation interval.

Such a structure reduces the amount of data representing the time-varying characteristics of the input values to the D/A converter, thereby realizing a compact radar system at a lower cost.

The expression may be a polynomial expression and the data concerning the expression may be a coefficient of each term of the polynomial expression. For example, use of a cubic polynomial expression (a cubic equation) can increase the accuracy at which the oscillation frequency of the voltage controlled oscillator monotonically varies with time.

The data processing unit preferably performs time integration of differential equations given by the first-order differentiation to the nth-order differentiation, where n represents the order of the polynomial expression, to determine the time-varying input values to the D/A converter. In this case, the data can be processed using only addition and subtraction, and without using multiplication or division. Accordingly, simple logic circuits, CPLDs, FPGAs and so on can be used instead of high-speed microcomputers or DSPs, thereby reducing the cost.

It is preferable that the expression be provided at various temperatures and the data processing unit refer to an expression corresponding to the detected temperature to determine the time-varying input values to the D/A converter. Thus, the characteristics become steady across a wider temperature range.

It is also preferable that the expression be provided at several discrete temperatures and the data processing unit determine data corresponding to the detected temperature by an interpolation or extrapolation method. In such a case, higher-accuracy correction with respect to temperature can be achieved with a reduced amount of data concerning the expression at various temperatures.

A radar system preferably includes a counter for monotonically counting a clock signal having a predetermined frequency incrementally during the up-modulation interval and decrementally during the down-modulation interval. The data processing unit preferably determines the input values to the D/A converter in accordance with the count value of the counter. Such a structure allows for determination of the time-varying input values to the D/A converter during the up modulation interval and also allows for the down-modulation interval to be determined by using a single expression, thereby reducing the circuit size.

In another preferred embodiment of the present invention, a method of adjusting characteristics of the radar system includes the steps of measuring the frequency of the transmission signal with, for example, a spectrum analyzer while the input values to the D/A converter are being varied to determine the relationship between the input values to the D/A converter and the frequency of the transmission signal, determining the data concerning the expression representing the time-varying characteristics of the input values to the D/A converter from the relationship, and storing the data in the data storing unit.

In this method, the characteristics can be properly adjusted for every radar system by determining time-varying characteristics of the input values to the D/A converter that monotonically change the oscillation frequency of the voltage controlled oscillator with time.

The above and other elements, features, characteristics and advantages of the present invention will become clear from the following description of preferred embodiments taken in conjunction with the accompanying drawings.

DETAILED DESCRIPTION OF PREFERRED EMBODIMENTS

A radar system and a method of adjusting characteristics thereof according to preferred embodiments of the present invention will now be described with reference to the attached drawings.

Figure 1:
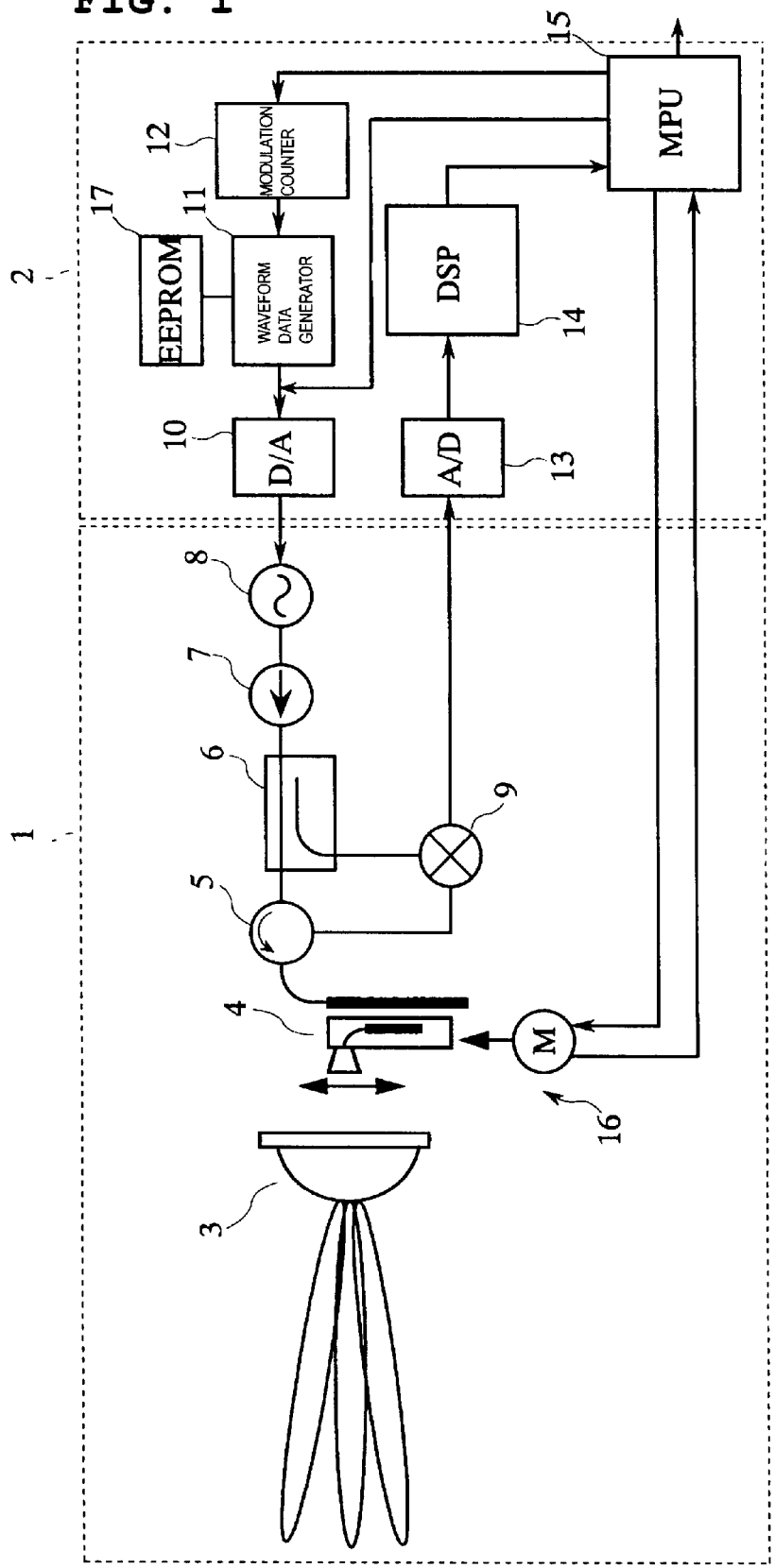
FIG. 1 is a block diagram showing the structure of a radar system according to a preferred embodiment of the present invention.

FIG. 1 is a block diagram showing the structure of a radar system according to a preferred embodiment of the present invention. The radar system preferably includes an RF (radio frequency) block 1 and a signal processing block 2. The RF block 1 transmits/receives radio waves for radar detection and outputs a beat signal that is generated by mixing transmitted waves and received waves to the signal processing block 2. A modulation counter 12 in the signal processing block 2 converts count values into a triangular waveform under the control of a microprocessor 15. An EEPROM (electrically erasable programmable read-only memory) 17 is a memory in which data required for monotonically changing the oscillation frequency during an up-modulation interval and a down-modulation interval is stored. A waveform data generator 11 outputs an output value to a D/A converter 10 based on data read from the EEPROM 17 and an output value from the modulation counter 12. The D/A converter 10 converts the output value from the waveform data generator 11 into an analog signal and feeds the converted signal to a VCO 8 in the RF block 1. As a result, the VCO 8 generates an oscillation signal that is frequency-modulated into the triangular waveform.

The oscillation signals generated in the VCO 8 are fed to a primary radiator 4 through an isolator 7, a coupler 6, and a circulator 5. The primary radiator 4 is disposed on or near the focal plane of a dielectric lens 3. The dielectric lens 3 transmits a millimeter-wave signal radiated from the primary radiator 4 as narrow beams. Reflected waves from a target such as a vehicle reach the primary radiator 4 through the dielectric lens 3, and then the received signal is fed to a mixer 9 through the circulator 5. The mixer 9 receives the signal from the circulator 5 and a local signal that is part of transmitted signal from the coupler 6, and outputs a beat signal having a frequency that is substantially equal to the frequency difference between the received signal and the local signal to an A/D converter 13 in the signal processing block 2 as an intermediate-frequency signal. The A/D converter 13 converts the intermediate-frequency signal into digital data. A DSP (digital signal processor) 14 processes the data sequence received from the A/D converter 13 by FFT (fast Fourier transformation) to calculate or obtain the frequency spectrum of the beat signal.

The microprocessor 15 directly outputs a specified value to the D/A converter 10 when adjusting the characteristics of the radar system. It ordinarily calculates the relative distance to the target and the relative speed thereof and outputs them to a host device.

A scan unit 16 in the RF block 1 moves the primary radiator 4 within the focal plane of the dielectric lens 3 or a plane in parallel therewith. A movable part and a fixed part including the primary radiator 4 constitute a 0-dB coupler. A driving motor M drives the 0-dB coupler.

Figure 2:
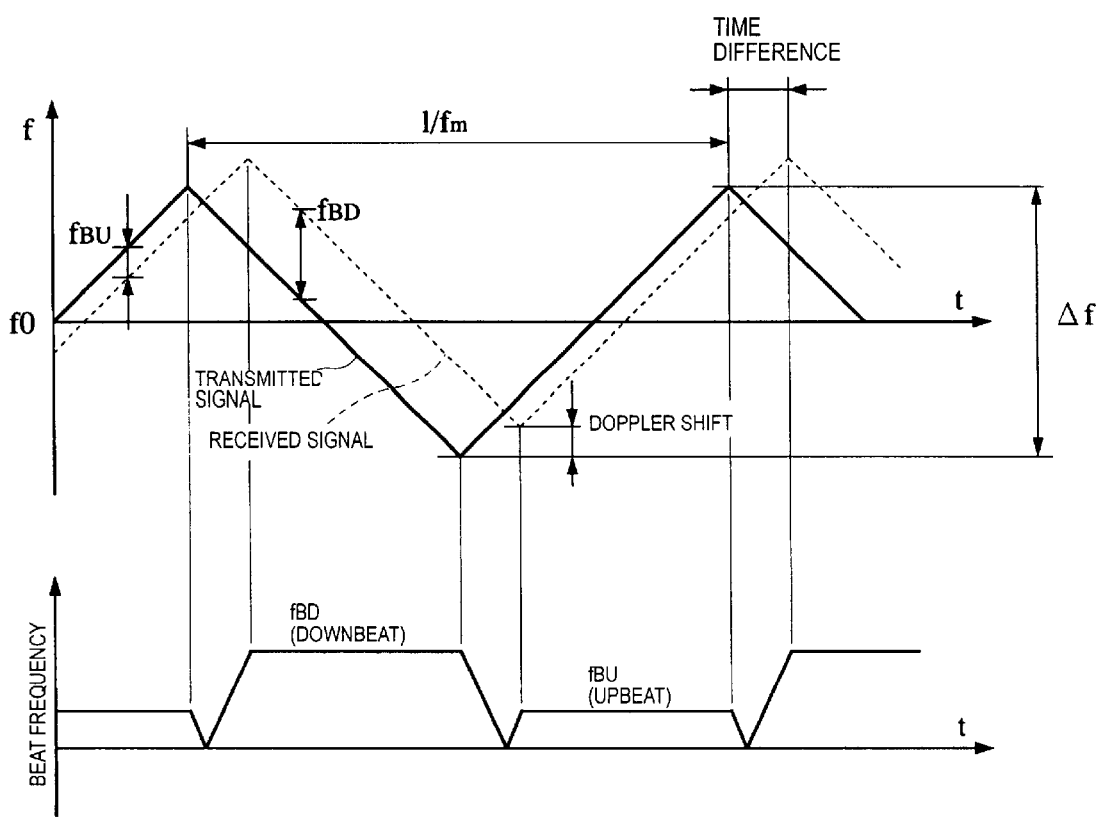
FIG. 2 is a graph illustrating a shift in frequency of a received signal from that of a transmitted signal due to the relative distance to the target and the relative speed thereof.

FIG. 2 is a graph illustrating a shift in frequency of a received signal from that of a transmitted signal due to the relative distance to the target and the relative speed thereof. Referring to FIG. 2, an upbeat frequency $f_{BU}$ represents the frequency difference between the transmitted signal and the received signal during the up-modulation interval of the transmitted signal. A downbeat frequency $f_{BD}$ represents the frequency difference between the transmitted signal and the received signal during the down-modulation interval of the transmitted signal. The time difference of triangular waveforms between the transmitted signal and the received signal corresponds to the time period during which the radio waves are emitted from the antenna to the target and are reflected from the target to the antenna. The frequency difference between the transmitted signal and the received signal corresponds to the amount of Doppler shift that is caused by the relative speed of the target with respect to the antenna. The upbeat frequency $f_{BU}$ and the downbeat frequency $f_{BD}$ vary with the time difference and the amount of the Doppler shift. In other words, the distance from the radar system to the target and the relative speed of the target with respect to the radar system are calculated from the upbeat frequency and the downbeat frequency.

Figure 3:
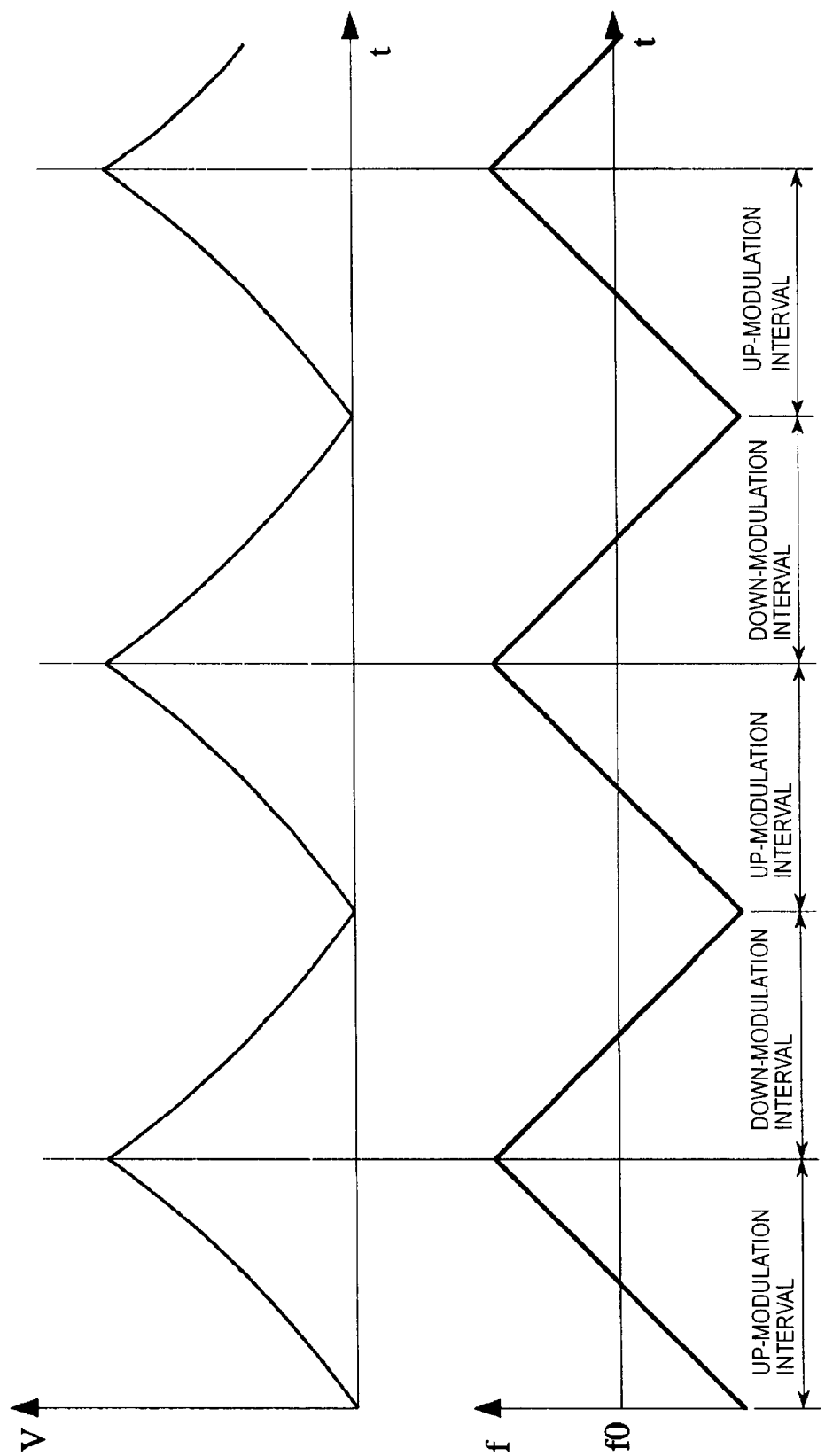
FIG. 3 shows the relationship between the time-varying characteristic of a voltage signal supplied to a VCO and the time-varying characteristic of a transmission frequency.

FIG. 3 shows the relationship between the time-varying characteristic of a voltage signal for frequency modulation supplied to the VCO 8 and the time-varying characteristic of a transmission frequency where the horizontal axis represents time, the vertical axis V represents a voltage signal for frequency modulation supplied to the VCO 8, and the vertical axis f represents the oscillation frequency of the VCO 8. The oscillation signal generated by the VCO is preferably frequency-modulated into a triangular waveform based on the principle of FM-CW radar systems. However, the relationship between the voltage signal for frequency modulation supplied to the VCO and the oscillation frequency of the VCO 8 generally cannot be represented by a linear expression or formula, so that the time-varying characteristic of the voltage signal for frequency modulation is not represented exactly as a triangular waveform as shown in FIG. 3.

Figure 4A:
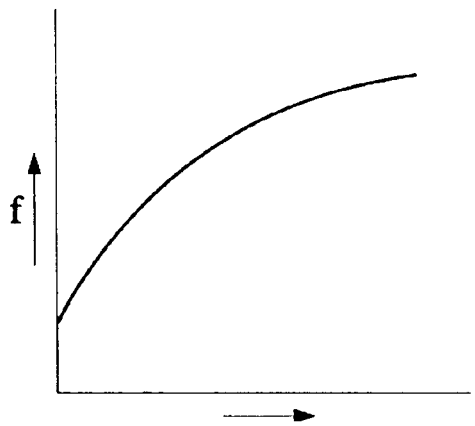
FIG. 4A is a graph showing the relationship between input values to a D/A converter and the oscillation frequency (transmission frequency) of the VCO.
Figure 4B:
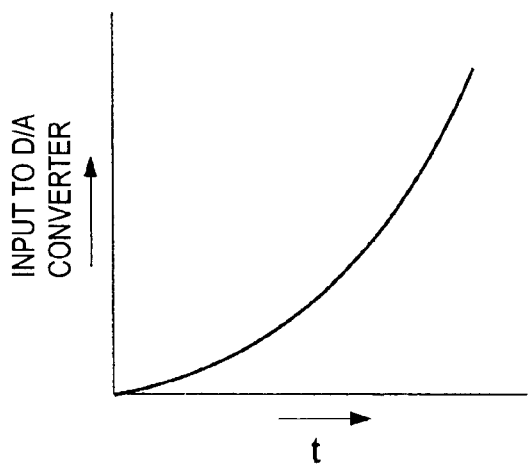
FIG. 4B is a graph showing the time-varying characteristic of the input values to the D/A converter.
Figure 4C:
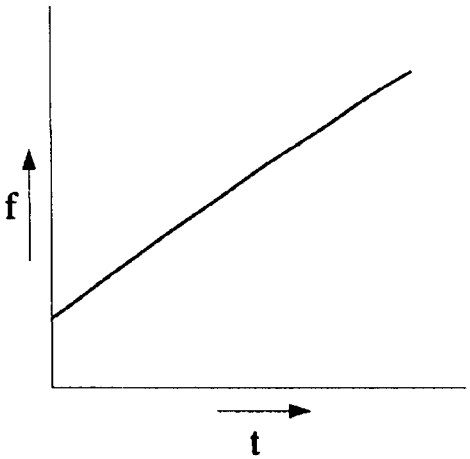
FIG. 4C is a graph showing how the oscillation frequency of the VCO varies with time.

FIGS. 4A to 4C illustrate the time-varying characteristic of the transmission frequency and so on during the up-modulation interval in FIG. 3. FIG. 4A is a graph showing the relationship between input values to the D/A converter and the oscillation frequency (transmission frequency) of the VCO. When the input values to the D/A converter monotonically vary, the oscillation frequency of the VCO does not vary linearly. FIG. 4B is a graph showing the time-varying characteristic of the input values to the D/A converter. FIG. 4C is a graph showing how the oscillation frequency of the VCO varies with time. Correction of the time-varying characteristic of the input values to the D/A converter in accordance with the relationship between the input values to the D/A converter and the oscillation frequency of the VCO shown in FIG. 4A allows the oscillation frequency of the VCO to monotonically increase with time, as shown in FIG. 4C.

The time-varying characteristic of the input values to the D/A converter shown in FIG. 4B, which is required for monotonically changing the oscillation frequency of the VCO with time, is expressed as an approximate expression or formula such as the following cubic polynomial equation:

$$x(t)=at^3+bt^2+ct+d \quad (1)$$

where t represents time and x represents an input value to the D/A converter. The curve showing how the input values to the D/A converter vary with time is drawn by determining coefficients a, b, c, and d in this expression. These coefficients are determined by a least squares method.

When the voltage-frequency characteristic is expressed as the monotonically increasing and decreasing curve without an inflection point (the point where double differentiation gives a zero value) within the range of control voltages applied to the VCO, sufficient correction accuracy is achieved with a cubic expression. In other words, the range of the control voltages applied to the VCO is specified such that the voltage-frequency characteristic of the VCO does not have an inflection point, and approximations are calculated with a cubic polynomial expression.

Figure 5:
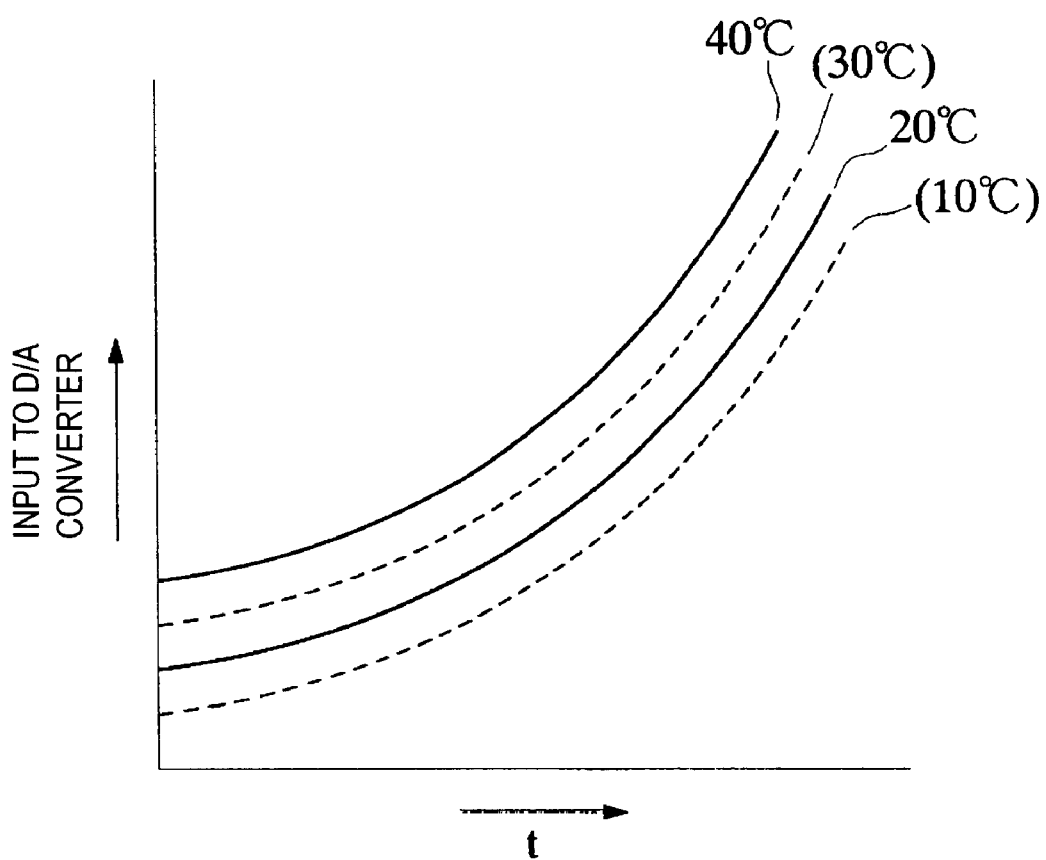
FIG. 5 is a graph showing how the input values to the D/A converter vary with time at given temperatures.

FIG. 5 is a graph showing how the input values to the D/A converter vary with time at given temperatures. Since the voltage-frequency characteristic of the VCO varies with temperature, the time-varying characteristic of the input values to the D/A converter must be determined at various temperatures in order to increase the stability against temperature changes. Referring to FIG. 5, two solid curves show the characteristics at temperatures of about 40° C. and about 20° C., respectively.

Although the variation characteristics of the input values to the D/A converter at two temperatures are measured in FIG. 5, it may be possible to measure the input values to the D/A converter at more temperatures, for example, at temperatures of approximately −40° C., −20° C., ±0° C., +20° C., +40° C., +60° C., and +80° C.

The variation characteristics of the input values to the D/A converter at temperatures other than the measured temperatures are preferably determined by an interpolation method or an extrapolation method. For example, at a temperature of about 30° C., intermediate values are interpolated or obtained from the curves at a temperature of about 40° C. and at a temperature of about 20° C. That is, the coefficients a, b, c, and d are determined such that the curve passing through the intermediate values is drawn. Also, the values at a temperature of about 10° C. are extrapolated or obtained from the curves at about 40° C. and about 20° C. to determine the coefficients a, b, c, and d.

For example, the coefficient $a_{+30}$ at a temperature of about 30° C. is linearly interpolated with the following equation:

$$a_{+30}=(a_{+40}+a_{+20})/((40-20)/(40-30))$$

where $a_{+40}$ represents the coefficient at about 40° C. and $a_{+20}$ represents the coefficient at about 20° C.

Interpolation and extrapolation methods are not limited to use of the linear interpolation and extrapolation. Spline interpolation and extrapolation, polynomial interpolation and extrapolation, and other suitable methods may be used Once the coefficients a, b, c, and d of the cubic polynomial expression described above are determined, the input values to the D/A converter can be calculated from the expression. However, instead of directly calculating the cubic polynomial expression, only addition and subtraction may be performed. The method of such an operation will now be described.

The differential equation of formula (1) is as follows:

$$x'''(t)=6a \quad (2)$$

The initial values are as follows:

$$x(0)=d \quad (3)$$

$$x'(0)=c \quad (4)$$

$$x''(0)=2b \quad (5)$$

At the same time, the following equations are derived from the definition of differentiation:

$$x'(t)=lim[\Delta t\rightarrow 0]\{x(t+\Delta t)-x(t)\}/\Delta t \quad (6)$$

$$x''(t)=lim[\Delta t\rightarrow 0]\{x'(t+\Delta t)-x'(t)\}/\Delta t \quad (7)$$

$$x'''(t)=lim[\Delta t\rightarrow 0]\{x''(t+\Delta t)-x''(t)\}/\Delta t \quad (8)$$

When $\Delta t=1$ in formulae (6) to (8), these equations are converted into the following differential equations:

$$x'(t)=x(t+1)-x(t) \quad (9)$$

$$x''(t)=x'(t+1)-x'(t) \quad (10)$$

$$x'''(t)=x''(t+1)-x''(t) \quad (11)$$

Formulae (9) to (11) are transformed into the following equations based on formula (2):

$$x(t+1)=x(t)+x'(t) \quad (12)$$

$$x'(t+1)=x'(t)+x''(t) \quad (13)$$

$$x''(t+1)=x''(t)+6a \quad (14)$$

Thus, the values of the cubic polynomial expressions can be calculated using only addition and subtraction by sequentially determining the input values using the initial values given by formulae (3) to (5) when t is varied as t=0, 1, 2 . . . 1023 in formulae (12) to (14).

Since multiplication and division require much higher computing power than addition and subtraction, using only the additions and subtractions to calculate the values can achieve a short computation time and save hardware resources. Simple logic circuits, CPLDs (complex programmable logic devices), FPGAs (field programmable gate arrays), and so on can constitute the hardware instead of microcomputers, so that the hardware size can be considerably reduced to realize high-speed compact operations at low cost.

The modulation counter 12 in FIG. 1 monotonically counts clock signals with a given frequency incrementally during the up-modulation interval and monotonically counts them decrementally during the down-modulation interval, and it provides the counted values to the waveform data generator 11. Thus, the waveform data generator 11 does not need to store respective data for the up-modulation interval and for the down-modulation interval, thereby reducing the required amount of memory.

Figure 6:
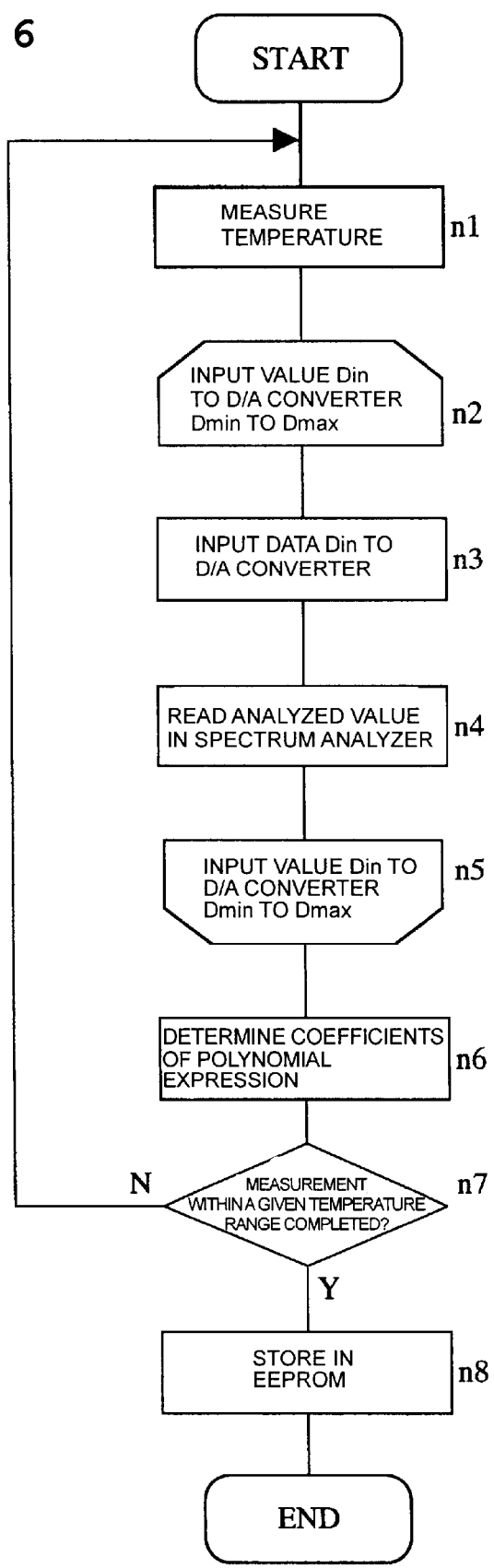
FIG. 6 is a flowchart showing the process of determining the coefficients of an expression representing the time-varying characteristics of the input values to the D/A converter.

The process of determining the coefficients of an expression representing the time-varying characteristics of the input values to the D/A converter will now be described with reference to FIG. 6.

First, a spectrum analyzer for receiving a transmitted signal outputted from the radar system and measuring the frequency of the received signal is installed. In Step n1, the ambient temperature (the operating temperature of the VCO 8) of the radar system is measured. In Steps n2 through n5, a transmission frequency is measured with the spectrum analyzer while an input value Din to the D/A converter 10 is gradually varied from the minimum value Dmin to the maximum value Dmax. The steps n2 through n5 are repeated to determine the relationship between the input values to the D/A converter 10 and the transmission frequency. In Step n6, the coefficients of the polynomial expression are determined.

The range over which the required amount of frequency shift occurs is selected based on the relationship between the transmission frequency and the input values to the D/A converter 10, and the selected frequency range is divided by a required number (the number of clock periods used for modulation during the up-modulation or down-modulation interval). For example, the frequency range extending to about 150 MHz above and below the frequency at the midpoint value of the input values to the D/A converter 10 is divided by $2^{10}-1=1024$ to determine the corresponding oscillation frequencies. Then, the input values to the D/A converter 10 having the frequency that is closest to the determined oscillation frequency are determined and the sequence of numbers is approximated with a cubic polynomial expression.

The above steps are repeated when the ambient temperature of the radar system is changed within a given temperature range (n7→n1→ . . . ). In Step n8, each coefficient of the polynomial expression at every measured temperature is stored in the EEPROM 17. The input value Din is directly supplied to the D/A converter 10 from the microprocessor 15.

Instead of correcting the frequency characteristic of voltages applied to the VCO 8, determination of the time-varying characteristics of the input values to the D/A converter 10 based on the relationship between the transmission frequency and the input values to the D/A converter allows the oscillation frequency of the VCO to be corrected allowing for various varying factors, such as:

(1) variations of supply voltage of the radar system,
(2) variations of reference voltage of the D/A converter,
(3) variations in downstream circuits (loads) from the VCO, and
(4) variations in output frequency when varying the temperature, including effects of the supply voltage, the reference voltage of the D/A converter, and the downstream circuits from the VCO as well as the VCO itself. Accordingly, the detection performance of the FM-CW radar system is greatly improved.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A radar system comprising:

a transmitting/receiving unit for repeatedly transmitting a triangular transmission signal including a frequency-gradually-rising up-modulation interval and a frequency-gradually-dropping down-modulation interval and for receiving a reception signal including a reflected signal from a target, the transmitting/receiving unit having a voltage controlled oscillator for determining a transmission frequency, a voltage signal for frequency modulation being supplied to the voltage controlled oscillator;

a frequency analysis unit for calculating data concerning a frequency spectrum of a beat signal that has a frequency that is substantially equal to a difference between a frequency of the transmission signal and a frequency of the reception signal;

a data storing unit for storing time-varying characteristics of input values to a D/A converter that monotonically change an oscillation frequency of the voltage controlled oscillator with time, in the form of data concerning an expression representing the time-varying characteristics; and a data processing unit for determining the input values to the D/A converter with reference to the data concerning an expression representing the time-varying characteristics;

wherein at least one of a relative distance to the target and a relative speed of the target is detected based on the beat signal during the up-modulation interval and the beat signal during the down-modulation interval.

2. A radar system according to claim 1, wherein the expression representing the time-varying characteristics is a polynomial expression and the data concerning the expression is a coefficient of each term of the polynomial expression.

3. A radar system according to claim 2, wherein the data processing unit performs time integration of differential equations given by the first-order differentiation to the nth-order differentiation where n represents the order of the polynomial expression.

4. A radar system according to claim 1, wherein the expression representing the time-varying characteristics is provided at various temperatures and the data processing unit refers to the expression corresponding to a detected temperature.

5. A radar system according to claim 1, wherein the expression representing the time-varying characteristics is provided at several discrete temperatures and the data processing unit determines data corresponding to the detected temperature by one of an interpolation and an extrapolation method.

6. A radar system according to claim 1, further comprising a counter for monotonically counting a clock signal having a predetermined frequency incrementally during the up-modulation interval and decrementally during the down-modulation interval, wherein the data processing unit determines the input values to the D/A converter in accordance with a count value of the counter.

7. A radar system according to claim 1, wherein the data storage unit includes an electrically erasable programmable read-only memory.

8. A radar system according to claim 1, further comprising a primary radiator, an isolator, a coupler and a circulator, wherein oscillation signals generated in the voltage controller oscillator are fed to the primary radiator through the isolator, the coupler, and the circulator.

9. A radar system according to claim 8, further comprising a dielectric lens, wherein the primary radiator is disposed on or near a focal plane of the dielectric lens and the dielectric lens transmits a millimeter-wave signal radiated from the primary radiator as narrow beams.

10. A radar system according to claim 1, wherein oscillation signals generated by the voltage controlled oscillator is frequency-modulated into a triangular waveform based on the principle of frequency-modulated continuous-wave radar systems.

11. A radar system according to claim 2, wherein the expression representing the time-varying characteristics is a cubic polynomial equation.

12. A radar system according to claim 2, wherein the expression representing the time-varying characteristics is as follows:

$$x(t)=at^3+bt^2+ct+d,$$

where t represents time and x represents an input value to the D/A converter, and a, b, c, and d are coefficients determined by a least squares method.

13. A radar system according to claim 1, wherein the time-varying characteristics of the input values to the D/A converter are determined based on a relationship between the transmission frequency and the input values to the D/A converter.

14. A method of adjusting characteristics of a radar system including a transmitting/receiving unit for repeatedly transmitting a triangular transmission signal including a frequency-gradually-rising up-modulation interval and a frequency-gradually-dropping down-modulation interval and for receiving a reception signal including a reflected signal from a target, the transmitting/receiving unit having a voltage controlled oscillator for determining a transmission frequency, a voltage signal for frequency modulation being supplied to the voltage controlled oscillator, a frequency analysis unit for calculating data concerning a frequency spectrum of a beat signal that has a frequency that is substantially equal to a difference between a frequency of the transmission signal and a frequency of the reception signal, a data storing unit for storing time-varying characteristics of input values to a D/A converter that monotonically change an oscillation frequency of the voltage controlled oscillator with time, in the form of data concerning an expression representing the time-varying characteristics, and a data processing unit for determining the input values to the D/A converter with reference to the data concerning an expression representing the time-varying characteristics, wherein at least one of a relative distance to the target and a relative speed of the target is detected based on the beat signal during the up-modulation interval and the beat signal during the down-modulation interval, the method comprising the steps of:

measuring the frequency of the transmission signal while the input values to the D/A converter are being varied to determine a relationship between the input values to the D/A converter and the frequency of the transmission signal;

determining the data concerning the expression representing the time-varying characteristics of the input values to the D/A converter from the relationship; and storing the data in the data storing unit.

15. A method according to claim 14, wherein the time-varying characteristics of the input values to the D/A converter are determined based on a relationship between the transmission frequency and the input values to the D/A converter.

16. A method according to claim 14, wherein the expression representing the time-varying characteristics is a polynomial expression and the data concerning the expression is a coefficient of each term of the polynomial expression.

17. A method according to claim 15, wherein the data processing unit performs time integration of differential equations given by the first-order differentiation to the nth-order differentiation where n represents the order of the polynomial expression.

18. A method according to claim 14, wherein the expression representing the time-varying characteristics is provided at various temperatures and the data processing unit refers to the expression corresponding to a detected temperature.

19. A method according to claim 14, wherein the expression representing the time-varying characteristics is provided at several discrete temperatures and the data processing unit determines data corresponding to the detected temperature by one of an interpolation and an extrapolation method.

20. A method according to claim 14, further comprising the step of monotonically counting a clock signal having a predetermined frequency incrementally during the up modulation interval and decrementally during the down-modulation interval, wherein the data processing unit determines the input values to the D/A converter in accordance with a count value of the counter.

21. A method according to claim 14, wherein oscillation signals generated by the voltage controlled oscillator is frequency-modulated into a triangular waveform based on the principle of frequency-modulated continuous-wave radar systems.

22. A method according to claim 15, wherein the expression representing the time-varying characteristics is a cubic polynomial equation.

23. A method according to claim 15, wherein the expression representing the time-varying characteristics is as follows:

$$x(t)=at^3+bt^2+ct+d,$$

where t represents time and x represents an input value to the D/A converter, and a, b, c, and d are coefficients determined by a least squares method.

* * * * *